United States Patent [19]

Kawagoshi et al.

[11] 4,060,498
[45] Nov. 29, 1977

[54] PROCESS FOR STEAM REFORMING OF HYDROCARBONS

[75] Inventors: Hiroshi Kawagoshi, Hitachi; Masato Takeuchi, Katsuta; Fumito Nakajima, Hitachi, all of Japan

[73] Assignee: Hitachi, Ltd., Japan

[21] Appl. No.: 520,950

[22] Filed: Nov. 4, 1974

Related U.S. Application Data

[62] Division of Ser. No. 364,427, May 29, 1973, abandoned.

[30] Foreign Application Priority Data

June 2, 1972    Japan .................. 47-55241

[51] Int. Cl.² ............................................. C07C 2/14
[52] U.S. Cl. .................................... 252/373; 252/459; 252/462; 252/466 J; 252/474; 48/214 A
[58] Field of Search ................ 252/373; 48/214 R A, 48/196, 197

[56] References Cited

U.S. PATENT DOCUMENTS

| | | | |
|---|---|---|---|
| 1,711,036 | 4/1929 | Beekley | 252/373 |
| 2,056,911 | 10/1936 | Schiller et al. | 252/373 X |
| 2,119,565 | 6/1938 | Williams | 252/373 |
| 3,328,477 | 6/1967 | Taylor et al. | 48/214 A X |
| 3,395,004 | 7/1968 | Taylor et al. | 48/214 A |
| 3,395,104 | 7/1968 | Taylor et al. | 48/214 A |
| 3,404,100 | 10/1968 | Taylor et al. | 48/214 A X |
| 3,410,661 | 12/1968 | Taylor | 252/373 X |
| 3,645,915 | 2/1972 | Stiles | 48/216 A |

FOREIGN PATENT DOCUMENTS

| | | | |
|---|---|---|---|
| 6,616,179 | 5/1968 | Netherlands | 252/373 |
| 1,032,754 | 6/1966 | United Kingdom | 252/373 |

*Primary Examiner*—Howard T. Mars
*Attorney, Agent, or Firm*—Craig & Antonelli

[57] ABSTRACT

A process for steam reforming of hydrocarbons utilizing a catalyst comprising at least 3% by weight, preferably 10, to 30% by weight of nickel per weight of the catalyst, at least 2 mg-atoms of silver per 100 g of the catalyst; if necessary at least one of rare earth elements such as lanthanum, cerium, yttrium, praseodimium, neodimium, or a mixture of rare earth elements in an atomic ratio of the rare earth elements to silver of 10 or less, preferably 0.2 to 2.0; and a heat-resistant oxide carrier such as alumina, silica, magnesia, titania, zirconia, beryllia or thoria.

10 Claims, 3 Drawing Figures

PROCESS FOR STEAM REFORMING OF HYDROCARBONS

CROSS REFERENCE TO THE RELATED APPLICATION

This is a divisional application of the U.S. application Ser. No. 364,427 filed on May 29, 1973 and now abandoned.

This invention relates to a steam reforming of hydrocarbons by using a novel catalyst.

Now, steam hydrocarbon reforming processes are dominant in the production of hydrogen gas, fuel gas or various synthesis gases. The steam reforming of hydrocarbons is usually carried out by passing hydrocarbons, mainly paraffinic hydrocarbons, in a gaseous state, through catalysts packed in a heat-resistant cylinder, together with steam, under conditions of a temperature of 400° to 800° and a pressure of normal to 30 kg/cm².

The steam reforming reaction can be represented by the following equation, when hydrocarbons are given by CmHn:

$$CmHn + mH_2O \rightarrow mCO + (m + n/2)H_2 \quad (1)$$

$$CmHn + 2mH_2O \rightarrow mCO_2 + (2m + n/2)H_2 \quad (2)$$

The reaction process includes thermal decomposition, hydrogenation, etc. in addition to the above-mentioned reaction equations, and the resulting product gas consists mainly of hydrogen, carbon monoxide, carbon dioxide, methane and steam. A relation among these components can be represented by the following equilibrium equations:

$$CH_4 + H_2O \rightleftarrows CO + 3H_2 \quad (3)$$

$$CO + H_2O \rightleftarrows CO_2 + H_2 \quad (4)$$

The equilibrium composition of product gas depends upon temperature, pressure and ratios of feed materials (steam-carbon ratio: a ratio of moles of steam per gram-atom of carbon of the hydrocarbon, which will be hereinafter referred to as "H₂O/C"; a carbon dioxide-carbon ratio: a ratio of moles of carbon dioxide per gram-atom of carbon of the hydrocarbon, which will be hereinafter referred to as "CO₂/C"), and therefore the desired gas, for example, hydrogen gas, fuel gas or various synthesis gas, can be obtained.

The most important problem in the use of the steam reforming catalyst is a problem of carbon deposition onto the catalyst, though dependent upon the conditions, when hydrocarbons are reacted with steam.

Principal reactions concerning the carbon deposition are given by the following equations:

$$CmHn \rightarrow C + Cm'Hn' + H_2 \quad (5)$$

$$2CO \rightarrow C + CO_2 \quad (6)$$

The carbon deposition onto the catalyst causes the activity of the catalyst to become lower, but more serious problems are pulverization and disintegration of the catalyst by the carbon deposition, and the consequent inevitable discontinuation of operation due to the clogging of a gas conduit.

To prevent the carbon deposition, H₂O/C is usually increased. An increase in H₂O/C can suppress the carbon deposition onto the catalyst, but this leads to consumption of the feed materials, fuel, etc. on the contrary, and thus the increase in H₂O/C is not economical.

Generally, olefinic hydrocarbons are more liable to cause carbon deposition than the paraffinic hydrocarbons, and therefore when gas or liquid hydrocarbons containing the olefinic hydrocarbons are used as a feed material, a hydrogenation reactor and a desulfurisation reactor are usually provided at the upstream side of the steam reformer.

As the prior art catalysts having a suppression effect upon the carbon deposition, there have been heretofore available catalysts containing nickel as a main component and potassium as a promoter on a heat-resistant oxide carrier. These catalysts have a function to prevent active carbon, which is formed at the reforming of hydrocarbon, from deposition as stable carbon. However, potassium is liable to migrate through the catalyst, and evaporate off owing to its low melting point. As a result, the potassium evaporated off from the catalysts is condensed and deposited at low temperature parts at the downstream side of the steam reformer apparatus and disadvantageously clogs a piping system.

Furthermore, there have been heretofore available catalysts containing nickel and uranium carried on a heat-resistant oxide. These catalysts have a function to promote reaction of the active carbon, which is deposited on the catalysts at the reforming, with water to form hydrogen gas and carbon monoxide, but have a restricted use because the uranium as the promoter is a radioactive element.

Furthermore, these catalysts have a good carbon control effect upon paraffinic hydrocarbons, but have not yet a successful effect upon controlling carbon deposition when olefinic hydrocarbons are used as a feed material.

The most important requirement for the steam reforming catalyst is a prevention of carbon deposition onto the catalyst with a ratio of H₂O/C as small as possible.

Another requirement for the steam reforming catalyst is that a variety of hydrocarbons can be applied to the catalyst.

Other requirement is a high activity, especially an excellent activity in a broad range of temperatures and pressures.

Furthermore, high heat resistance and physical strength, which withstand higher temperature and pressure, are also one of other requirements for the steam reforming catalyst.

An object of the present invention is to provide a process for steam reforming hydrocarbons by use of a novel hydrocarbon steam reforming catalyst that meets the above-mentioned requirements. That is, it is the object of the present invention to provide a steam hydrocarbon reforming catalyst having a good suppression effect upon carbon deposition even at a low ratio of H₂O/C equally for a variety of hydrocarbons in the reforming process.

According to one embodiment of the present invention, the present steam hydrocarbon reforming catalyst contains nickel as a main active component of the catalyst and at least 2 mg-atoms of silver as a promoter per 100 g of the catalyst, on a heat-resistant oxide carrier.

According to another embodiment of the present invention, the present steam hydrocarbon reforming catalyst contains nickel as a main active component of the catalyst, at least 2 mg-atoms of silver per 100 g of the catalyst, and at least one of rare earth elements in an atomic ratio of the rare earth elements to silver of 10 or less as promoters on a heat-resistant oxide.

The raw materials for nickel used in the present invention as the main active component of the catalyst include nickel oxide, nickel nitrate, nickel carbonate, nickel oxalate, nickel formate, etc.

The raw materials for silver used in the present invention as the promoter include an oxide, nitrate, carbonate, etc. of silver.

As the rare earth elements used in the present invention as another promoter component, lanthanum, cerium, yttrium, praseodymium, neodymium, etc. can be used. In view of the availability and cost, lanthanum, cerium, yttrium, etc. are preferable. Mixtures of rare earth elements, obtained from monoazite, xenotime, bastnaesite, etc. can be used. As the raw materials of these rare earth elements to be carried on the heat-resistant oxide, there can be mentioned oxides, nitrates, carbonates, hydroxides, oxalates, etc.

The heat-resistant oxides used in the present invention include alumina, silica, magnesia, titania, zirconia, beryllia, thoria, etc. The heat-resistant oxide may be of any shape, for example, spherical or cylindrical, or in a crushed form or powdery form. Generally, when acidic oxides such as alumina, silica, etc. are used as the carrier, carbon is liable to deposit, but it is formed that the catalyst composition of the present invention can considerably prevent the carbon deposition, even if these acidic oxides are used as the carrier.

Quantitative proportions of said catalyst components of the present catalyst are given below:

Nickel is contained in an amount of at least 3% by weight, preferably 10 to 30% by weight, in terms of NiO, based on the weight of the catalyst.

When silver is contained in an amount of less than 2 mg-atoms per 100 g of the catalyst, the suppression effect of carbon deposition is not satisfactory, and a rate of carbon deposition exceeds 40 mg/hr. at the ordinary rate of feed hydrocarbons unless the ratio of $H_2O/C$ is made higher than 3. As a result, the operation of the steam reformer apparatus is disturbed. The amount of silver can be increased for over 2 mg-atoms, so long as the main catalyst component nickel can be maintained over its lower limit.

Even if the catalyst components are only nickel and silver, the carbon deposition can be suppressed to 10 mg/hr. or less in the steam reforming of paraffinic hydrocarbon so long as the nickel and silver are contained within said ranges.

When the rare earth element is further added to the catalyst, the effect of suppressing carbon deposition, and heat resistance can be increased.

The rare earth element is contained in the catalyst in an atomic ratio of the rare earth element to silver of 10 or less. If the atomic ratio exceeds 10, positions of distributed silver are microscopically too far from one another, and the action to suppress the carbon deposition takes place locally on the catalyst, and the action of silver is not satisfactory. As a result, the carbon deposition amounts to more than 40 mg/hr. at the ordinary rate of feed hydrocarbons. The present catalyst works well without any rare earth element, but an effect of the rare earth element appears when the catalyst contains 2 mg-atoms or more of silver per 100 g of the catalyst.

Cause for the action of silver as a promoter upon the suppression of carbon deposition has not been yet clarified, but when silver salt compounds are carried on a heat-resistant oxide, silver can improve a reactivity between the active carbon and steam.

Further, the rare earth elements are alkaline substances, and have a good affinity towards acidic metal oxides such as alumina and silica. Therefore, the rare earth element can adhere to alumina or silica sufficiently and convert the surface of alumina or silica to an alkaline property, whereby the suppression effect upon the carbon deposition seems to be increased. Further, the oxides of the rare earth elements have a good heat resistance, and it seems that the rare earth elements improve the heat resistance of the catalyst and prevent deterioration of the catalyst due to the heat.

The present inventors tried to steam reform hydrocarbons over catalysts containing copper of the same Periodic Table Group as silver in place of the catalyst containing silver, but no suppression effect upon the carbon deposition was observed.

There is no special restriction to the procedure for preparing the present catalyst. One example is given below:

A mixture of water soluble compounds of nickel, silver and, as desired, rare earth elements, which are mixed with one another in ranges as defined above, is mixed with powders of heat-resistant oxides in a dry or slurry state, and the resulting mixture is shaped and calcined, whereby the desired catalyst can be prepared. No change is observable in the catalyst performance, even if the silver compound and the rare earth element are mixed at the same time or successively or stagewise.

The catalyst thus obtained can be applied to steam reforming of a wide range of feed hydrocarbons including methane, off-gas from processes utilizing various hydrocarbon materials as a feed, liquefied natural gas, hydrocarbons having higher molecular weights than that of methane, for example, liquid hydrocarbons such as liquefied petroleum gas, butane, hexane, petroleum light distillates, naphtha, etc.

The hydrocarbon is supplied over the catalyst together with steam, and contacted with the catalyst in a wider temperature range than the conventional one, that is, a range of from 350° to 900° C, and in a wider pressure range than the conventional one, that is, a range of from 1 to 50 kg/cm².

When hydrocarbons containing not more than 1% of olefinic hydrocarbon are steam reformed over the present catalyst, the carbon deposition is 15 mg/hr. or less in the case of the catalyst of nickel-silver system, and 2 mg/hr. or less in the case of the catalyst of nickel-silver-rare earth elements, even both at a ratio of $H_2O/C$ of 0.75 or more.

When an off-gas from the petroleum industry utilizing hydrocarbons as a raw material is steam reformed over the conventional catalyst, the off-gas must be once passed over a hydrogenation catalyst in advance to convert the olefinic hydrocarbons to paraffinic hydrocarbons to prevent the carbon deposition. When the feed gas is passed over the hydrogenation catalyst, temperature of the feed gas is elevated due to the hydrogenation reaction, and an activity of the hydrogenation catalyst is lost. Therefore, there has been a limit to the content of the olefinic hydrocarbon in the feed gas.

According to the present invention, the feed gas containing about 15% by volume of olefinic hydrocarbon can be directly steam reformed over the present catalyst without passing the gas over the hydrogenation catalyst layer without any trouble. This can reduce the construction cost of the reforming plant and make operation of the reforming plant considerably easier.

In that case, the carbon deposition can be suppressed to 20 mg/hr. or less at a ratio of $H_2O/C$ of 3.0 even with said content of olefinic hydrocarbon. Especially in the case of the catalyst of nickel-silver-rare earth elements, the carbon deposition can be suppressed to 5 mg/hr. or less at a ratio of $H_2O/C$ even with said content of olefinic hydrocarbon.

If a catalyst activity is represented in terms of a rate of carbon supplied, that is, number of gram-atoms of carbon of feed hydrocarbon supplied per unit volume of catalyst per unit time, unreacted hydrocarbon can be kept 0.01% or less, for example, in the case of n-butane, at 55 g-atoms of carbon/hr. 1 of catalyst. Thus, the present catalyst has a practically satisfactory activity.

The present process using a novel catalyst is suitable for steam reforming directed to production of hydrogen gas, methane-rich fuel gas or various synthesis gases for methanol synthesis, oxo-synthesis, etc., and can directly steam reform a feed gas containing olefins. Further, the present catalyst can be used at a low ratio of $H_2O/C$ and thus is applicable to the production of gas for ore reduction.

Furthermore, the process utilizing the present catalyst has a good suppression effect upon carbon deposition, and thus the present catalyst can be filled at a part where carbon is liable to deposit in the steam reforming apparatus, usually an inlet part, and the conventional catalyst can be filled at other part.

Now, the present invention will be described in detail by way of examples, referring to the accompanying drawings.

EXAMPLE 1

Catalysts of the present invention and catalysts for comparison were prepared in the following manner:

Catalyst A (Catalyst of the present invention):

75.0 g of nickel nitrate hexahydrate, 9.3 g of lanthanum nitrate hexahydrate, and 3.67 g of silver nitrate were dissolved in water separately, and the resulting three aqueous solutions were mixed together to make a total volume 70 ml. 100 g of spherical active alumina carriers having sizes of 7 to 12 mesh were impregnated with the resulting solution mixture, and dried at 110° C for 3 hours and then calcined at 900° C for 2 hours.

The resulting catalyst contained 15.4% by weight of nickel in terms of NiO, and 17.2 mg-atoms of lanthanum per 100 g of the catalyst (21.6 mg-atoms of lanthanium per 100 g of the carriers), and had an atomic ratio of lanthanum to silver of 1.0.

Catalyst B (Catalyst of the present invention):

75.0 g of nickel nitrate hexahydrate and 7.34 g of silver nitrate were dissolved in water, separately, and the resulting two aqueous solutions were mixed together to make a total volume 70 ml. 100 g of spherical active alumina carriers having sizes of 7 to 12 mesh were impregnated with the resulting solution mixture, dried at 110° C for 3 hours, and calcined at 900° C for 2 hours.

The resulting catalyst contained 15.5% by weight of nickel in terms of NiO, and 34.7 mg-atoms of silver per 100 g of the catalyst.

Catalyst C (Catalyst for Comparison):

75.0 g of nickel nitrate hexahydrate and 18.7 g of lanthanum nitrate hexahydrate were dissolved in water, separately, and the resulting two aqueous solutions were mixed together to make a total volume 70 ml. 100 g of spherical active alumina carriers having sizes of 7 to 12 mesh were impregnated with the resulting solution mixture, dried at 110° C for 3 hours and then calcined at 900° C for 2 hours.

The resulting catalyst contained 16.2% by weight of nickel in terms of NiO.

Catalyst D (Catalyst for comparison):

75.0 g of nickel nitrate hexahydrate and 18.7 g of lanthanum nitrate hexahydrate were dissolved in water, respectively; and the resulting two aqueous solutions were mixed together to make a total volume 70 ml. 100 g of spherical active alumina carriers having sizes of 7 to 12 mesh were impregnated with the resulting solution mixture, dried at 110° C for 3 hours and calcined at 900° C for 2 hours.

The resulting catalyst contained 15.3% by weight of nickel in terms of NiO, and 34.2 mg-atoms of lanthanum per 100 g of the catalyst.

25 ml each of the catalysts prepared in the foregoing manner was packed in each of reactor tubes having an inner diameter of 15 mm, and catalyst layer temperature was elevated so that the catalyst layer might have 600° C or more at the inlet and 800° C or more at the outlet, and hydrogen was passed through the reactor tubes at a flow rate of about 300 ml/minute together with steam for 1 to 2 hours to reduce the catalysts. Then, the catalysts were used for experiments.

Reaction was carried out by keeping an inlet temperature and outlet temperature of the catalyst layer at predetermined ones, setting feeding rates of n-butane, steam and carbon dioxide so that ratios of $H_2O/C$ and $CO_2/C$ could have the predetermined ones, and feeding the raw materials through the reactor tube after a preheating part, thereby effecting reaction over the catalyst. The reaction product gas is led to an analysis section through a cooler and trap, and total analysis of reaction product gas components except for water was carried out by gas chromatograph.

Amount of carbon deposits was determined by feeding oxygen to the catalyst layer after the end of the reaction experiment to convert the deposited carbon to carbon dioxide, and quantitatively measuring the resulting carbon dioxide.

When experiments were to be carried out over the same catalyst by changing the ratios of $H_2O/C$ and $CO_2/C$, the catalyst were again reduced and used for the experiments.

Figure 1:
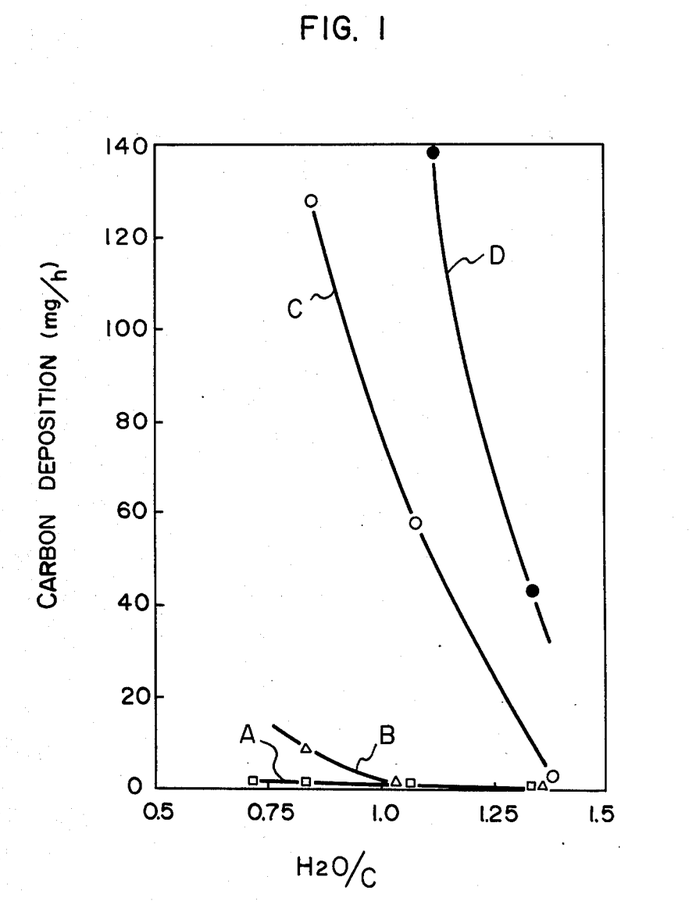
FIG. 1 is a diagram showing relations between ratios of $H_2O/C$ and carbon deposition when n-butane is steam reformed over the present catalyst, one embodiment of the present invention.

In FIG. 1, relations between the ratio of $H_2O/C$ and the carbon deposition at the steam reforming of n-butane under the atmospheric pressure are illustrated for each catalyst. The steam reforming conditions of FIG. 1 are as follows:

| | |
|---|---|
| Outlet temperature of catalyst layer: | 730° – 800° C |
| Catalyst amount: | 25 ml |
| Reaction time: | 1 hr. |

-continued

| Experiment pressure: | atmospheric |
|---|---|

In Table 1, experimental data such as reaction product gas composition, carbon deposit, etc. including the data under an elevated pressure are shown:

Oxoreforming reaction of n-butane was carried out for 25 ml each of the catalysts at an outlet temperature of the catalyst of 785° to 825° C under a pressure of 15 kg/cm² at ratios of $H_2O/C$ and $CO_2/C$ of about 1.2 in the manner similar to that of Example 1, and carbon deposits were determined. The reaction time was one hour, and the carbon feed rate was 32–33 g-atoms- Table 1

| Catalyst | Carbon feed rate (*) | $H_2O/C$ | $CO_2/C$ | Pressure (kg/cm²) | Catalyst layer outlet temp. (° C.) | Reaction product gas composition (vol. %) | | | | | Carbon deposition (mg/hr) | Remark |
|---|---|---|---|---|---|---|---|---|---|---|---|---|
| | | | | | | $H_2$ | CO | $CO_2$ | $CH_4$ | $C_4H_{10}$ | | |
| Catalyst A | 55.1 | 3.02 | 0.0 | 1.0 | 830 | 71.1 | 15.9 | 12.1 | 0.91 | <0.001 | | |
| | 54.4 | 3.06 | 0.0 | " | 508 | 57.6 | 3.4 | 19.7 | 19.3 | " | | |
| | 32.5 | 3.01 | 0.0 | 15 | 595 | 47.3 | 3.9 | 19.5 | 29.3 | " | | |
| | 32.5 | 3.01 | 2.95 | " | 590 | 15.5 | 6.1 | 64.9 | 13.5 | " | | |
| | 56.7 | 3.00 | 0.0 | " | 785 | 71.0 | 13.9 | 11.0 | 4.3 | " | | |
| | 56.7 | 3.00 | 2.85 | " | 744 | 29.5 | 23.0 | 44.8 | 2.7 | " | | |
| | 32.4 | 1.18 | 0.0 | " | 820 | 59.6 | 19.6 | 6.3 | 14.5 | " | 1.2 | |
| | 32.4 | 1.20 | 1.20 | " | 800 | 38.3 | 34.5 | 22.5 | 4.7 | " | 1.5 | |
| Catalyst B | 56.2 | 2.89 | 0.0 | 1.0 | 842 | 71.8 | 16.5 | 11.5 | 0.12 | <0.001 | | |
| | 59.0 | 3.00 | 0.0 | " | 535 | 59.5 | 3.7 | 20.3 | 16.5 | " | | |
| | 32.6 | 3.01 | 0.0 | 15 | 589 | 46.7 | 2.7 | 19.4 | 31.2 | " | | |
| | 32.5 | 3.03 | 3.01 | " | 595 | 15.9 | 6.9 | 65.5 | 11.7 | " | | |
| | 57.0 | 2.97 | 0.0 | " | 784 | 70.9 | 13.7 | 11.2 | 4.2 | " | | |
| | 56.8 | 2.99 | 2.93 | " | 743 | 29.7 | 23.1 | 45.9 | 1.3 | " | | |
| | 32.7 | 1.19 | 0.0 | " | 815 | 59.9 | 20.7 | 5.7 | 13.7 | " | 7.5 | |
| | 32.3 | 1.19 | 1.22 | " | 803 | 38.7 | 35.2 | 22.0 | 4.1 | " | 9.1 | |
| Catalyst C | 59.2 | 2.89 | 0.0 | 1.0 | 840 | 71.8 | 17.5 | 10.6 | 0.06 | <0.001 | | |
| | 56.1 | 2.92 | 0.0 | " | 570 | 58.3 | 3.88 | 20.0 | 17.7 | 0.195 | | |
| | 32.5 | 3.02 | 0.0 | 15 | 599 | 49.0 | 2.70 | 18.8 | 29.5 | 0.023 | | |
| | 32.5 | 3.02 | 3.06 | " | 591 | 15.8 | 6.80 | 65.7 | 11.7 | 0.036 | | |
| | 56.5 | 3.05 | 0.0 | " | 790 | 71.4 | 13.8 | 11.2 | 3.6 | 0.004 | | |
| | 56.5 | 3.05 | 3.01 | " | 741 | 29.6 | 23.1 | 45.7 | 1.65 | 0.011 | | |
| | 32.5 | 1.19 | 0.0 | " | 815 | 60.0 | 20.3 | 5.8 | 13.9 | <0.001 | 110.9 | 0.2 kg/cm² ** |
| | 32.4 | 1.20 | 1.23 | 15 | 799 | 38.5 | 35.1 | 22.1 | 4.31 | 0.003 | 127.2 | 0.5 kg/cm² ** |
| Catalyst D | 55.6 | 2.99 | 0.0 | 1.0 | 835 | 72.2 | 16.1 | 11.7 | 0.05 | 0.027 | | |
| | 58.9 | 2.83 | 0.0 | " | 533 | 58.5 | 2.91 | 20.7 | 17.6 | 0.397 | | |
| | 32.5 | 2.99 | 0.0 | 15 | 576 | 44.7 | 2.00 | 19.3 | 33.9 | 0.057 | | |
| | 32.5 | " | 3.09 | " | 578 | 14.3 | 5.40 | 67.4 | 12.7 | 0.186 | | |
| | 57.6 | " | 0.0 | " | 789 | 70.9 | 13.6 | 11.5 | 4.07 | 0.008 | | |
| | 57.6 | " | 2.86 | " | 762 | 29.9 | 22.9 | 44.9 | 2.16 | 0.036 | | |
| | 32.6 | 1.20 | 0.0 | " | 798 | 58.2 | 19.2 | 6.70 | 15.8 | 0.017 | 39.6 | |
| | 32.6 | 1.18 | 1.19 | " | 785 | 36.5 | 33.2 | 23.9 | 6.42 | 0.049 | 101.1 | |

* g-atoms-C/hr.l-catalyst
** Difference in pressure between the upstream and downstream sides of the catalyst layer It is apparent from the experimental results of Table 1 that the catalysts C and D (Catalysts for comparison) have a little higher concentration of the residual butane and thus have a little lower catalytic activity, whereas the catalysts A and B of the present invention have a low concentration of the residual butane, reaction product gas compositions almost identical with the equilibrium ones, and a good catalytic activity over a wide range of temperatures.

Furthermore, the present catalysts A and B have remarkably less carbon deposition, as compared with the catalysts C and D (Catalysts for comparison), and thus have a good suppression effect upon carbon deposition. This is seen from the experimental results under the atmospheric pressure shown in FIG. 1.

EXAMPLE 2

Catalysts were prepared in a manner similar to that of Example 1 by changing the atomic ratio of lanthanum to silver, and their suppression effects upon the carbon deposition were investigated.

That is, molar ratios of lanthanum nitrate to silver nitrate were adjusted to 100 : 0 (Catalyst D); 95 : 5; 80 : 20; 65 : 35; 50 : 50 (Catalyst A); 35 : 65; 20 : 80; 5 : 95; 0 : 100 (Catalyst B), but the sum total of gram-atoms of lanthanum and silver per 100 g of the carrier was made constant, that is, 43.2 mg-atoms.

Figure 2:
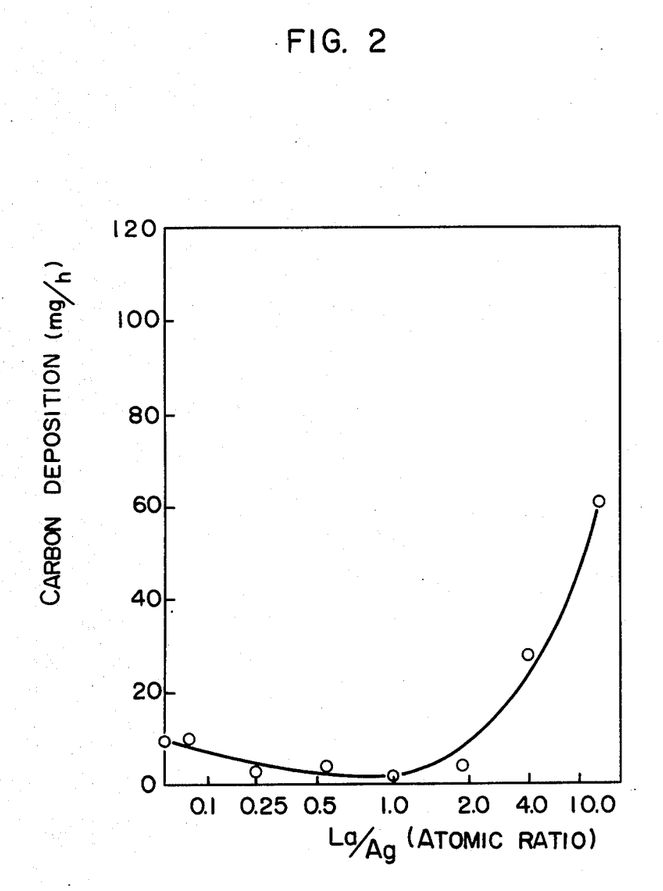
FIG. 2 is a diagram showing a relation between ratios of $La/A_g$ and carbon deposition when n-butane is oxo-reformed over the present catalyst, one embodiment of the present invention.

C/hr.l-catalyst. The results are summarized in FIG. 2. It is apparent from FIG. 2 that, even in the case that only silver was used as a promoter, the suppression effect upon the carbon deposition was far excellent, as compared with the nickel-alumina catalyst C or nickel-lanthanum-alumina catalyst D, and could be successfully used for practical purpose. When the rare earth element was added thereto, the suppression effect upon the carbon deposition was much improved, and at the same time the good heat resistance and long life could be obtained.

When the atomic ratio of lanthanum to silver was too large, and the catalyst approached a composition of the nickel-lanthanum-alumina catalyst D, the suppression effect upon the carbon deposition was lowered, and the catalyst activity was also lowered. Therefore, catalysts must be prepared so that the atomic ratio of rare earth element to silver may be in a range of 0 to 10, preferably 0.2 to 2.0.

EXAMPLE 3

Aluminum nitrate nonahydrate, nickel nitrate hexahydrate, lanthanum nitrate hexahydrate and silver nitrate were weighed out in the weights as shown in Table 2, and dissolved in water, separately. The resulting four aqueous solutions were mixed together to make a total volume 2 l, and then admixed with ammonia water dropwise to form precipitates. After the settling, supernatant was removed by decantation. Then, the residue was admixed with 2 l of distilled water, stirred and decanted. This process was repeated twice, and then the residue was filtered off. The residue was then dried at 110° C for 10 hours, and pulverized. The resulting powders were admixed with 2% by weight of polyvinyl alcohol, and then shaped into pellets having a diameter of 10 mm and a thickness of 5 mm under a shaping pressure of 500 kg/cm². The resulting pellets were calcinated at 900° C for two hours, and used as catalysts.

per 100 g of the catalyst is also desirable to expect the effect of lanthanum.

EXAMPLE 4

Oxoreforming of naphtha as a feed material was carried out over the catalysts A to D as shown in Example 1.

The experimental procedure was the same as in Example 1, except that naphtha was used in place of n-butane. Properties of the naphtha used as the feed material are given as follows:

Table 2

| Catalyst | Aluminum nitrate (g) | Nickel nitrate (g) | Lanthanum nitrate (g) | Silver nitrate (g) | NiO (wt. %) | $Al_2O_3$ (wt. %) | La (mg-atom/ 100 g catalyst) | Ag (mg-atom/ 100 g catalyst) |
|---|---|---|---|---|---|---|---|---|
| E | 563.1 | 75.0 | 0.48 | 0.19 | 19.3 | 80.4 | 1.1 | 1.1 |
| F | 561.0 | " | 0.95 | 0.37 | " | 80.1 | 2.2 | 2.2 |
| G | 556.8 | " | 1.86 | 0.73 | " | 79.5 | 4.3 | 4.3 |
| H | 521.9 | " | 9.35 | 3.67 | " | 74.5 | 21.6 | 21.6 |
| I | 478.4 | " | 18.70 | 7.34 | " | 68.3 | 43.2 | 43.2 |
| J | 391.5 | " | 37.91 | 14.68 | " | 55.9 | 86.4 | 86.4 |

The catalyst activity and carbon deposit were measured for the catalysts E to J prepared in the foregoing procedure in the manner similar to that of Example 1, and influences of the amounts of lanthanum and silver as promoters were investigated. The results are given in Table 3.

| Paraffinic hydrocarbon | 94.6 vol. % |
|---|---|
| Olefinic hydrocarbon | 0.2 vol. % |
| Naphthenic hydrocarbon | 3.0 vol. % |
| Aromatic hydrocarbon | 2.3 vol. % |
| Formula corresponding to the mean Molecular weight: | $C_{6.4}H_{14.4}$ |
| Specific gravity (15°/4°): | 0.6755 |
| Initial boiling point: | 35.4° C |

Table 3

| Catalyst | Carbon feed rate * | $H_2O/C$ | $CO_2/C$ | Pressure (kg/cm²) | Catalyst layer outlet temp. (° C) | Reaction product gas composition (vol. %) | | | | | Carbon deposition (mg/hr) |
|---|---|---|---|---|---|---|---|---|---|---|---|
| | | | | | | $H_2$ | CO | $CO_2$ | $CH_4$ | $C_4H_{10}$ | |
| E | 32.6 | 1.21 | 1.23 | 15 | 803 | 36.5 | 32.0 | 25.1 | 6.4 | 0.005 | 31.6 |
| F | 32.4 | 1.18 | 1.20 | " | 801 | 36.9 | 33.1 | 24.9 | 5.1 | <0.001 | 7.5 |
| G | 32.4 | 1.18 | 1.21 | " | 805 | 37.2 | 33.6 | 24.3 | 4.9 | " | 3.6 |
| H | 32.5 | 1.20 | 1.17 | " | 796 | 36.8 | 32.5 | 25.0 | 5.7 | " | 1.2 |
| I | 32.4 | 1.19 | 1.24 | " | 800 | 37.2 | 33.3 | 24.3 | 5.2 | " | 1.8 |
| J | 32.6 | 1.20 | 1.27 | " | 789 | 36.5 | 31.2 | 26.0 | 6.3 | 0.001 | 1.9 |

* g-atom-C/hr.l-Catalyst.

As is apparent from Table 3 that the reaction product gas composition is almost identical with the equilibrium composition, and a good catalyst activity was obtained. The amount of carbon deposit is decreased with an End point: 135.2° C Experimental results such as reaction product gas composition, carbon deposit, etc. are given in Table 4.

Table 4

| Catalyst | Carbon feed rate * | $H_2O/C$ | $CO_2/C$ | Pressure (kg/cm²) | Catalyst layer outlet temp. (° C) | Reaction product gas composition (vol. %) | | | | | Carbon deposition (mg/hr) |
|---|---|---|---|---|---|---|---|---|---|---|---|
| | | | | | | $H_2$ | CO | $CO_2$ | $CH_4$ | $C_6H_{14}$ | |
| A | 31.9 | 3.00 | 2.98 | 15.0 | 803 | 27.1 | 26.7 | 45.3 | 0.87 | <0.001 | 2.3 |
|   | 55.8 | 3.01 | 3.01 | " | 793 | 27.0 | 24.8 | 46.9 | 1.20 | 0.001 | 3.7 |
|   | 32.1 | 1.50 | 1.49 | " | 801 | 34.0 | 34.2 | 27.7 | 3.73 | <0.001 | 6.5 |
| B | 32.2 | 3.02 | 2.99 | 15.0 | 800 | 27.5 | 26.6 | 45.1 | 0.83 | <0.001 | 8.7 |
|   | 55.9 | 3.01 | 3.03 | " | 790 | 26.8 | 26.4 | 45.6 | 1.23 | " | 15.1 |
|   | 32.1 | 1.50 | 1.52 | " | 804 | 34.2 | 33.9 | 28.3 | 3.59 | " | 29.4 |
| C | 32.1 | 2.99 | 3.01 | 15.0 | 798 | 27.1 | 26.4 | 45.5 | 0.98 | 0.057 | 38.4 |
|   | 55.9 | 3.02 | 3.03 | " | 790 | 26.8 | 25.7 | 46.2 | 1.13 | 0.131 | 57.6 |
|   | 31.9 | 1.52 | 1.50 | " | 800 | 34.0 | 33.8 | 28.3 | 3.89 | 0.021 | 396.7 |
| D | 32.1 | 3.01 | 3.01 | 15.0 | 803 | 27.4 | 26.7 | 45.1 | 0.81 | 0.042 | 15.3 |
|   | 56.1 | 3.01 | 3.02 | " | 795 | 27.0 | 26.1 | 45.6 | 1.17 | 0.077 | 19.6 |
|   | 32.0 | 1.51 | 1.51 | " | 798 | 33.6 | 33.7 | 28.9 | 3.81 | 0.016 | 110.9 |

* g-atom-C/hr. l-catalyst increase in the contents of lanthanum and silver, and it is necessary that there be at least 2 mg-atoms of silver per 100 g of the catalyst. Further, when there is lanthanum at the same time, at least 2 mg-atoms of lanthanum It is apparent from Table 4 that the catalysts A and B (Catalysts of the present invention) result in less concentration of the residual hexane than the Catalysts C and D (catalysts for comparison), and have an ability to promote sufficient decomposition and reforming reactions even if a feed material consisting of higher hydrocarbons is used, and thus have a good catalytic activity.

Further, the catalysts A and B (catalysts of the present invention), particularly catalyst A have a remarkable suppression effect upon the carbon deposition over the catalysts C and D (catalysts for comparison), and can be successfully used for naphtha as the feed material even at a ratio of $H_2O/C$ as low as 1.5.

EXAMPLE 5

Reforming of methane containing olefinic hydrocarbons was carried out over the catalysts A to D of Example 1. to make comparison of the performances of the catalysts. Sample gas used in the experiment was a gas mixture of methane, ethylene and hydrogen, in which an ethylene concentration was varied in a range of 0 to 17 vol. %, while the hydrogen partial pressure was set to 15 vol. % and the remainder was balanced with methane. The sample gas was fed over the catalyst at a ratio of $H_2O/C$ of 3.0 together with steam, and the reaction was carried out for 25 ml each of the catalysts A to D under the following reaction conditions according to a manner similar to that of Example 1:

| | |
|---|---|
| Pressure: | 8 kg/cm² |
| Catalyst layer inlet temperature: | 500° C |
| Catalyst layer outlet temperature: | 750° C |
| Reaction time: | 1 hr. |
| Carbon feed rate: | 30 g-atom-C/hr.l-catalyst |

Figure 3:
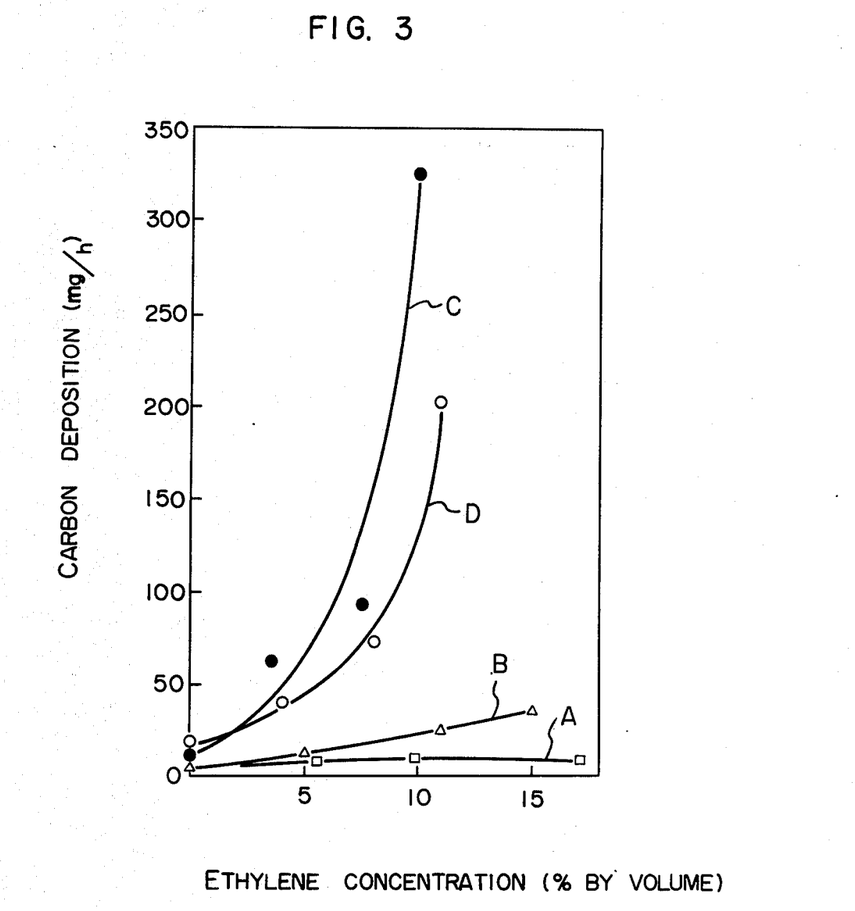
FIG. 3 is a diagram showing relations between ethylene concentrations and carbon deposition when ethane containing ethylene is steam reformed over the present catalyst, one embodiment of the present invention.

Relations between the ethylene concentration and the carbon deposition were investigated, and the results are shown in FIG. 3.

It is apparent from FIG. 3 that the amount of carbon deposit is increased with an increase in ethylene concentration in the case of the catalysts C and D (catalysts for comparison), and is evidently influenced with the ethylene concentration, whereas there is no influence of ethylene concentration in the case of the catalysts A and B (catalysts of the present invention), especially the catalyst A.

Therefore, when the present steam reforming catalyst is employed, a feed gas containing olefinic hydrocarbons at a higher concentration can be directly fed to a stream reformer apparatus without any pretreatment in a hydrogenation reactor.

EXAMPLE 6

Catalysts were prepared as follows:

Catalyst K (catalyst of the present invention):

75.0 g of nickel nitrate hexahydrate, 3.67 g of silver nitrate and 5.8 g of a mixture of rare earth elements obtained from monazites were dissolved in water, separately, and the resulting three aqueous solutions were mixed together to make a total volume 70 ml. 100 g of spherical active alumina carriers having sizes of 7 to 12 mesh were impregnated with the resulting solution mixture, dried at 110° C for 3 hours, and calcined at 900° C for 2 hours.

The resulting catalyst contained 15.5% by weight of nickel in terms of NiO, 17.2 mg-atoms of silver per 100 g of the catalyst (21.6 mg-atoms of silver per 100 g of the carrier), and 6.8 mg-atoms of lanthanum, 10.8 mg/atoms of cerium, 2.9 mg-atoms of neodymium, and a small amount of praseodymium, samarium, etc. per 100 g of the catalyst.

Catalyst L (Catalyst of the present invention):

Catalyst was prepared in the same manner as in the preparation of the Catalyst K except that the mixture of rare earth elements of the Catalyst K was replaced with 9.38 g of cerium nitrate hexahydrate.

The resulting catalyst contained 15.4% by weight of nickel in terms of NiO, 17.2 mg-atoms of silver per 100 g of the catalyst (21.6 mg-atoms of silver per 100 g of the carrier) and 17.2 mg-atoms of cerium per 100 g of the catalyst.

Catalyst M (Catalyst of the present invention):

Catalyst was prepared in the same manner as in the preparation of the Catalyst K, except that the mixture of rare earth elements of the Catalyst K was replaced with 8.27 g of yttrium hexahydrate.

The resulting catalyst contained 15.4% by weight of nickel in terms of NiO, 17.2 mg-atoms of silver per 100 g of the catalyst (21.6 mg-atoms of silver per 100 g of the carrier) and 17.2 mg-atoms of yttrium per 100 g of the catalyst (21.6 mg-atoms of yttrium per 100 g of the carrier).

The amount of carbon deposits was determined for the catalysts K, L and M according to the procedure as shown in Example 1 to investigate their effects. The results are given in Table 5.

Table 5

| Catalyst | Carbon feed rate * | $H_2O/C$ | $CO_2/C$ | Pressure (kg/cm²) | Catalyst layer outlet temp. (° C.) | Reaction product gas composition (vol. %) | | | | | Carbon deposition (mg/hr) |
|---|---|---|---|---|---|---|---|---|---|---|---|
| | | | | | | $H_2$ | CO | $CO_2$ | $CH_4$ | $C_9H_{10}$ | |
| K | 32.5 | 1.20 | 0.0 | 15.0 | 801 | 58.1 | 19.3 | 6.7 | 15.9 | 0.001 | 3.5 |
| | 32.4 | 1.22 | 1.25 | " | 785 | 36.6 | 32.8 | 24.2 | 6.4 | 0.002 | 7.1 |
| L | 32.4 | 1.19 | 0.0 | 15.0 | 793 | 58.0 | 19.4 | 6.9 | 15.7 | <0.001 | 1.8 |
| | 32.6 | 1.18 | 1.19 | " | 788 | 36.3 | 32.7 | 24.1 | 6.9 | 0.002 | 3.9 |
| M | 32.3 | 1.19 | 0.0 | 15.0 | 800 | 58.5 | 19.4 | 7.0 | 15.1 | 0.001 | 5.1 |
| | 32.5 | 1.20 | 1.21 | " | 791 | 36.5 | 33.3 | 23.7 | 6.5 | 0.001 | 4.7 |

* g-atom-C/hr.l-catalyst

It is apparent from Table 5 that, when catalysts contain not only lanthanum, but also cerium, yttrium or a mixture of rare earth elements as promoters together with the silver on the carrier, the catalysts have a good catalytic activity and a good suppression effect upon carbon deposition. Furthermore, it is apparent that a good suppression effect upon carbon deposition can be obtained when a mixture of rare earth elements obtained from such ores as monazites, xenotimes, bastnaesites, etc. is used as the rare earth elements as a promoter.

What is claimed is:

1. In a process for steam reforming gaseous hydrocarbons selected from the group consisting of methane, liquefied natural gas, liquefied petroleum gas, butane, hexane, petroleum light distillates, naphtha and off-gas from processes utilizing various hydrocarbons as feeds, wherein the hydrocarbons are passed in a gaseous state through a catalyst together with steam at an elevated temperature under pressure whereby the hydrocarbons are subjected to a steam reforming reaction wherein the resulting product gas consists mainly of hydrogen, carbon monoxide, carbon dioxide, methane and steam with the relationship among these product components being represented by the following equilibrium equations:

$$CH_4 + H_2O \rightleftharpoons CO + 3H_2$$

$$CO + H_2O \rightleftharpoons CO_2 + H_2$$

the improvement wherein when said off-gas is the feed, said off-gas comprises paraffinic hydrocarbons and up to about 15% by volume of olefinic hydrocarbons and wherein said catalyst consists essentially of from 3% to 30% by weight of nickel in terms of NiO, based on the catalyst, at least 2 mg-atoms of silver per 100 gram of the catalyst, at least one rare earth element in an atomic ratio of the rare earth element to silver of 0.2 to 10, and a heat-resistant carrier, the elevated temperature being from 350 to 900° C. and the pressure being from 1 to 50 kg/cm².

2. The process of claim 1, wherein said rare earth element is in an atomic ratio of the rare earth element to silver of 0.2 to 2.0.

3. The process of claim 1, wherein the rare earth element is selected from the group consisting of lanthanum, cerium, yttrium, praseodymium, neodymium, a mixture of rare earth elements obtained from monazites, xenotimes or bastnasites.

4. The process of claim 1, wherein said catalyst contains nickel in an amount of 10 to 30% by weight of the catalyst in terms of NiO.

5. The process of claim 1, wherein said heat-resistant carrier is alumina, silica, magnesia, titania, zirconia, beryllia or thoria.

6. The process of claim 1, wherein a ratio of moles of steam per gram-atom of carbon of the hydrocarbon, $H_2O/C$, is 0.75 or more.

7. The process of claim 1, wherein the amount of silver is 2.2 to 86.4 mg-atom per 100 g of the catalyst.

8. The process of claim 1, wherein said catalyst contains nickel in an amount of from 3 to 30% by weight of the catalyst in terms of NiO, silver in an amount of from 2.2 to 86.4 mg-atom per 100 grams of the catalyst, and said rare earth element is present in an atomic ratio of the rare earth element to silver of from 0.2 to 2, and the rare earth element is selected from the group consisting of lanthanum, cerium, yttrium, praseodymium, neodymium, and a mixture of rare earth elements obtained from monazites, xenotimes or bastnasites.

9. The process of claim 8, wherein said heat-resistant carrier is alumina, silica, magnesia, titania, zirconia, beryllia or thoria.

10. The process of claim 1, wherein the content of silver is up to 86.4 mg-atom per 100 grams of catalyst.

* * * * *